Nov. 25, 1941.   C. J. FABER   2,264,023

VEHICLE SUSPENSION MECHANISM

Filed Sept. 18, 1939   2 Sheets-Sheet 1

INVENTOR
Charles J. Faber.
BY Harness, Lind, Pate & Harris
ATTORNEYS.

Nov. 25, 1941.  C. J. FABER  2,264,023
VEHICLE SUSPENSION MECHANISM
Filed Sept. 18, 1939  2 Sheets-Sheet 2

INVENTOR
Charles J. Faber.
BY Harness, Lind, Pater & Harris
ATTORNEYS

Patented Nov. 25, 1941

2,264,023

UNITED STATES PATENT OFFICE 2,264,023

VEHICLE SUSPENSION MECHANISM

Charles J. Faber, Detroit, Mich., assignor to Chrysler Corporation, Highland Park, Mich., a corporation of Delaware Application September 18, 1939, Serial No. 295,361

5 Claims. (Cl. 180—73)

This invention relates to vehicle suspension mechanism and particularly to a suspension for automotive vehicles wherein the suspension members each consists of a torsionally yieldable unit including a rubber biscuit arranged to support the load of the sprung parts of the vehicle in combined compression and torsion.

The principal object of the invention is to provide, in combination with a torque tube type of drive, a suspension of this type which is strong and durable yet of simple form and economical to manufacture.

A further object is to provide a suspension system for vehicles in which the suspension units are universally connected with the axle.

A further object is to provide a suspension for the rear axle of a motor vehicle which has noise and shock absorbing characteristics that are superior to the suspensions of the prior art.

A still further object is to provide a vehicle suspension for torque tube drives in which the unsprung mass is less than that in present types of suspensions.

A still further object is to provide an improved vehicle suspension wherein the suspension members are disposed a substantial distance above the axle and preferably within the confines of the body.

Other objects and advantages of the invention will be apparent from the following description taken in connection with the accompanying drawings in which.

Figure 1:
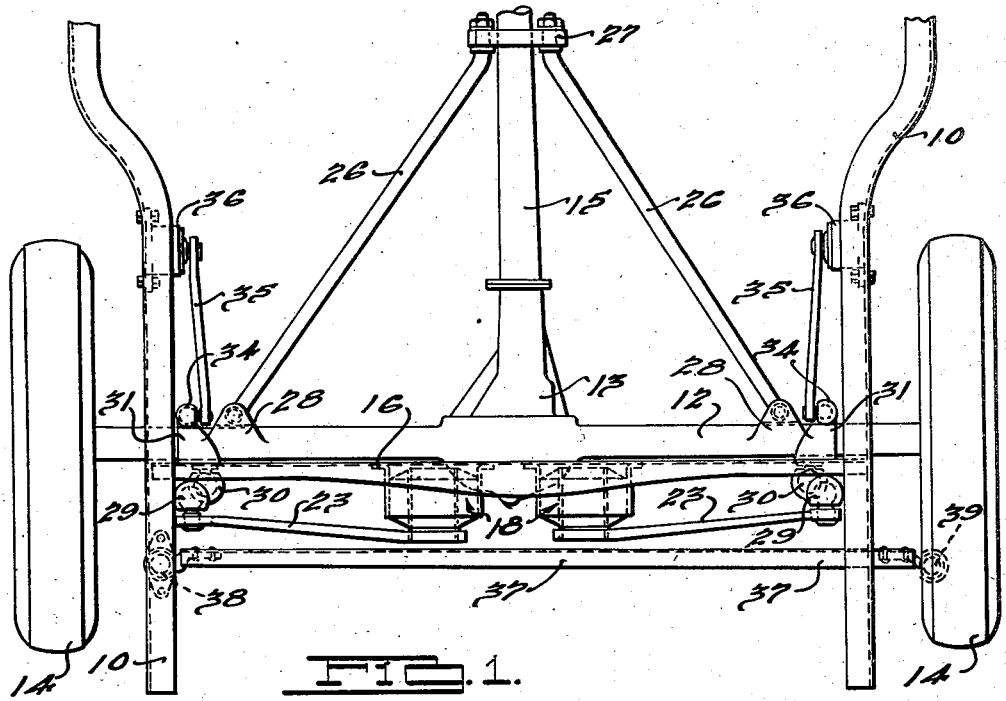
Fig. 1 is a top plan view of the improved suspension system.

Referring to the drawings in which like reference numerals designate like parts in the following description, the numeral 10 designates the chassis side sills to which the wheel-house portions 11 of the body are attached as is conventional in the art. A rear driving axle 12 provided with the usual differential gear housing 13 has the road wheels 14 mounted at each end thereof. A propeller shaft drivingly connects the differential gearing with the transmission mechanism T, the shaft being enclosed in a torque tube 15 which is rigidly connected to the differential housing 13 at its rear end and has the usual universal connection 15' to the rear end of the transmission housing. A pair of brace members 26 are rigidly attached to the torque tube 15 by means of a bracket 27 and diverge rearwardly therefrom toward the axle 12 to which they are connected by means of the integrally formed bosses 28.

Figure 2:
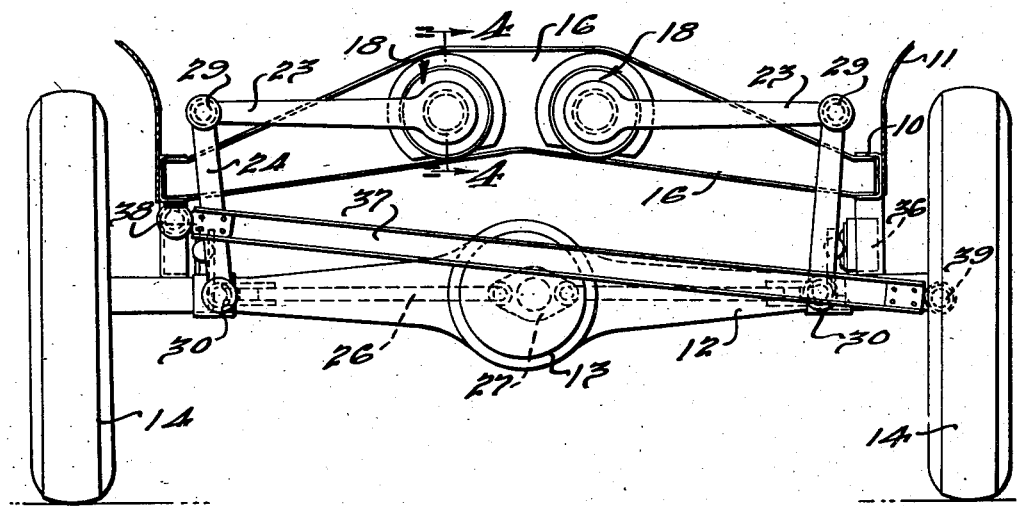
Fig. 2 is a rear elevation of the same.
Figure 3:
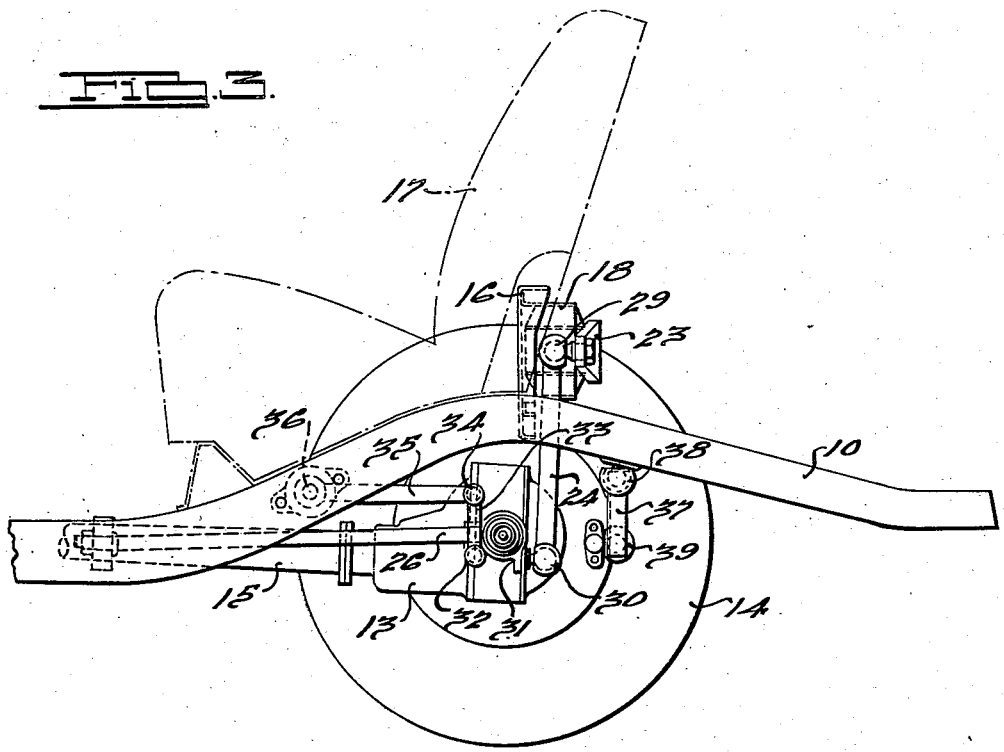
Fig. 3 is a side elevation of the same.

A cross member 16 of channeled form interconnects the side sills 10 directly in back of the rear seat 17. As illustrated in Fig. 2, this cross member is arched upwardly and is considerably wider at its central portion than at the ends and serves as a support for the suspension members 18. The latter comprise an outer cylindrical member 19 separated from an inner cylindrical member 20 by a body of rubber 21 which is bonded to each of the cylindrical members. While rubber is preferred as the suspension medium, any of the synthetic materials having rubber-like characteristics may be substituted for the natural rubber. Likewise, changes may be made in the shape and arrangement as a whole of the suspension unit without departing from the invention.

Figure 4:
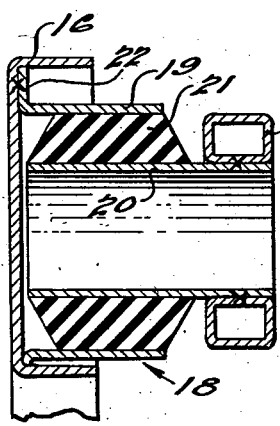
Fig. 4 is a sectional view through one of the rubber suspension members taken along line 4—4 of Fig. 2.
Figure 5:
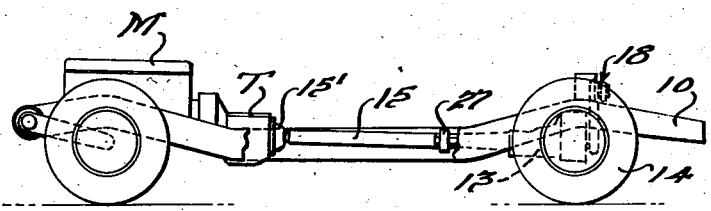
Fig. 5 is a side elevation, in a smaller scale, of a vehicle embodying the invention.

The outer cylinder 19 of the suspension unit has a flange 22 around one end thereof for attachment to the cross member 16. Any suitable attaching means may be employed, such as welding. The inner cylinder 20 is elongated in one direction along its axis for attachment to an arm member 23 of stamped metal construction. The arm 23 is welded at one end to the cylinder 20 as shown in Fig. 4 and is connected to the axle 12 at its other end by means of a link 24. The latter is connected to the arm 23 by a ball-and-socket connection 29 and to the axle 12 by a ball-and-socket connection 30, the latter connection being carried on the axle by a bracket 31 which also carries a ball-and-socket connection 32. The latter forms the axle connection for a link 33 which is connected to the arm 35 of a shock absorber 36 by a ball-and-socket connection 34. The shock absorber 36 may be of any suitable type and is supported on the frame member 10. The aforesaid structure is duplicated on each side of the vehicle as illustrated.

Movement of the axle transversely of the frame is controlled by the radius bar 37 which has one end universally connected to the frame 10 at 38 and its other end universally connected to brake backing plate at 39. The connections 38 and 39 are as far removed from one another as possible thereby reducing to a minimum the transverse movement of the frame relative to the axle during up-and-down movement of the latter.

By positioning the suspension units 18 above the plane of the chassis frame, lateral stability on turns is increased because the center of gravity is brought closer to the axis of the suspension and in some cases may even be below said axis. This arrangement is advantageous also in that it permits a lowering of the overall height of the vehicle and the suspension units are protected from exposure to oil, grease, mud, water, etc.

The ball joints 29, 30, 32, 34, 38 and 39 are preferably provided with rubber bushings to provide free universal action, and silent operation without the need for lubrication, but other types of bushings may be provided if desired.

It will thus be seen that the invention provides a suspension wherein the suspension elements themselves are called upon to perform only one function, i. e., that of cushioning the shocks incident to the movement of the wheels 14 over the ground. The driving and braking torque is transmitted to the frame by means of the torque members 15 and 26, and the anti-sway bar 37 prevents lateral displacement of the frame relative to the axle. The up-and-down movement of the axle 12 is resisted and controlled by the rubber biscuits 21 which are relieved of any other function because of the universal connections 29 and 30. Because of these universal connections and the universal connections 32, 34, 38 and 39, the axle 12 is free to move upwardly and downwardly about the connection 15' unrestrictedly, thus providing a cushioned ride that is free from harshness and shock.

By having thus described a preferred embodiment of my invention, it is not intended to limit the same, as various changes and modifications of the details thereof will be readily apparent to those skilled in the art.

I claim:

1. In a motor vehicle having a frame and a wheel carrying axle, a torque tube connecting said axle and said frame, means for suspending said axle in said frame comprising a pair of torsionally yieldable rubber suspension units disposed on said frame adjacent the longitudinal central vertical plane thereof, a pair of arms extending outwardly from said respective suspension units, links connecting the respective ends of said arms with said axle, said links having universal connection with said arms and said axle respectively.

2. In a motor vehicle having a frame and a wheel carrying axle, a torque member connecting said axle and said frame, a pair of torsional rubber suspension units mounted on said frame adjacent the longitudinal vertical central plane thereof, a pair of arms extending outwardly from said respective units, links universally connecting said suspension units and said axle, and an anti-sway bar extending transversely across the rear of said vehicle and having universal connection with said frame and said axle respectively.

3. The combination according to claim 2, in which the torsionally yieldable means includes rubber acting in shear.

4. In a motor vehicle having a frame and a wheel carrying axle, a propeller shaft drivingly connected to said axle, a torque tube surrounding said propeller shaft and connected to said frame and axle, means for mounting said axle in said frame for rising and falling movement relative thereto comprising an arm extending generally transversely of said frame and having a universal connection with said axle at its outer end, said connection being disposed within the lateral confines of said frame, and means for mounting the inner end of said arm on said frame for swinging movement about an axis disposed longitudinally of said vehicle comprising a cylindrical member fixed to said arm, a second cylindrical member surrounding said first member and fixed to said frame and a body of rubber filling the space between said members and bonded to each of them.

5. In a motor vehicle having a frame and a wheel carrying axle, means for suspending said axle from said frame comprising a pair of torsionally yieldable suspension units carried by said frame, an arm extending transversely of said frame from each of said units and disposed above the plane of said frame, a link extending between each arm and the axle and connected thereto by means of universal joint connections, said suspension units, arms, links and connections all being disposed within the lateral confines of said frame, means for preventing longitudinal displacement of said axle relative to the frame, means for preventing transverse displacement of said axle relative to the frame.

CHARLES J. FABER.